United States Patent [19]

Sawayama et al.

[11] 4,248,098
[45] Feb. 3, 1981

[54] FLOW METERING APPARATUS

[75] Inventors: Takehiro Sawayama; Ichizo Ito; Toshio Aga; Tetsuo Ando, all of Musashino, Japan

[73] Assignee: Yokogawa Electric Works, Ltd., Tokyo, Japan

[21] Appl. No.: 910,638

[22] Filed: May 30, 1978

[30] Foreign Application Priority Data

| May 30, 1977 | [JP] | Japan | 52-63124 |
| May 30, 1977 | [JP] | Japan | 52-63125 |
| Nov. 10, 1977 | [JP] | Japan | 52-151495 |
| Nov. 11, 1977 | [JP] | Japan | 52-135302 |

[51] Int. Cl.³ ............................................. G01F 1/32
[52] U.S. Cl. ............................................. 73/861.24
[58] Field of Search ...... 73/194 VS, DIG. 2, DIG. 4; 310/323, 329, 330

[56] References Cited

U.S. PATENT DOCUMENTS

| 1,215,135 | 2/1917 | Fisher | 73/194 |
| 3,116,639 | 1/1964 | Bird | 73/194 |
| 3,696,673 | 10/1972 | Ribner | 73/194 |
| 3,867,839 | 2/1975 | Herzl | 73/194 |
| 3,878,716 | 4/1975 | Asada | 73/194 |
| 3,888,120 | 6/1975 | Burgess | 73/194 |
| 4,054,808 | 10/1977 | Tanaka | 310/330 |
| 4,069,708 | 1/1978 | Fussell, Jr. | 73/194 |
| 4,123,940 | 11/1978 | Herzl et al. | 73/194 |
| 4,186,599 | 2/1980 | Frick | 73/194 |

OTHER PUBLICATIONS

Yamasaki et al., "Pulse Output Device Utilizing Karman Vorticies", 10/67, printed in SICE (Conference of Automatic Servomechanism, Japan).

Primary Examiner—Herbert Goldstein
Attorney, Agent, or Firm—Parmelee, Johnson, Bollinger & Bramblett

[57] ABSTRACT

A flow metering apparatus is disclosed which includes a dust in which a fluid to be measured flows, a pillar-shaped vortex generator inserted into the duct, and a force detector fixed firmly to the vortex generator substantially in an integrated manner, and capable of directly detecting an alternating force applied to the vortex generator due to Karman's vortex generated by the vortex generator, and converting the alternating force into an electric output signal.

12 Claims, 29 Drawing Figures

FIG. 1

BENDING MOMENT DIAGRAM

STRESS

FLOW METERING APPARATUS

BACKGROUND OF THE INVENTION

The present invention relates to a flow metering apparatus utilizing Karman's vortex, and more particularly to an improved apparatus which measures the velocity or quantity of a flow by detecting an alternating force caused in a vortex generator due to Karman's vortex and producing a vortex signal therefrom.

In general, when an object such as round bar is inserted into a fluid, stable and regular vortexes are generated on the left and right alternately to the flow in the downstream of the object. Such a vortex results from exfoliation of a boundary layer on the object surface and is called Karman's vortex.

It is well known heretofore that the number of vortexes (vortex generation frequency) generated behind the object during a unit time is proportional to the flow velocity of the fluid. Therefore, the flow velocity or quantity of the fluid can be obtained if the number of the vortexes generated during the unit time is found.

The flow metering apparatus according to the present invention detects an alternating force caused in a vortex generator due to such Karman's vortex and produces a vortex signal therefrom to measure the flow velocity or quantity.

The prior art for vortex signal detection known heretofore include a heat sensing system and a strain detecting system disclosed in the U.S. Pat. No. 3,972,232, in which various problems are left unsolved individually. In the heat sensing system, there occurs a sudden reduction of sensitivity if any slight dust or the like adheres to a thermistor or a heat sensing element such as platinum wire. And in the strain detecting system, for the purpose of causing a strain with high sensitivity by a small alternating force resulting from Karman's vortex, it is necessary to compose the vortex generator of a flexible material or to form a flexible region in the middle portion where the vortex generator is supported in a duct, so as to bond a strain detecting element thereto. And yet the strain on the object surface is required to be great for ensuring a sufficiently high detection sensitivity while the rigidity of the sensor should be small. In the U.S. Pat. No. 3,972, 232, the vortex generator is supported firmly in the duct, while the sensor is supported flexibly in a chamber formed in the vortex generator and is isolated from outside by means of a diaphragm, with the chamber being filled with oil. Accordingly, a solid construction is not attainable due to flexibility of the sensor and the diaphragm. Moreover, because of oil, there is restriction that prohibits operation in a high temperature range even with selective use of silicone oil or the like which is relatively resistant against high temperature.

The present invention is so constituted that the sensor is substantially integrated with the vortex generator for directly detecting the alternating force produced in the vortex generator. This eliminates the flexible parts and remarkably simplifies the construction with resultant solidity and durability while offering high sensitivity and stability with a merit of widening the working temperature range.

SUMMARY OF THE INVENTION

It is an object of the present invention to provide a flow metering apparatus having a simplified structure with solidity and durability.

Another object of the invention is to provide an improved flow metering apparatus excellent in sensitivity and stability.

And a further object of the invention is to provide an improved flow metering apparatus usable in a wide temperature range.

DESCRIPTION OF THE PREFERRED EMBODIMENTS

Hereinafter the present invention will be described with reference to the accompanying drawings.

Figure 1:
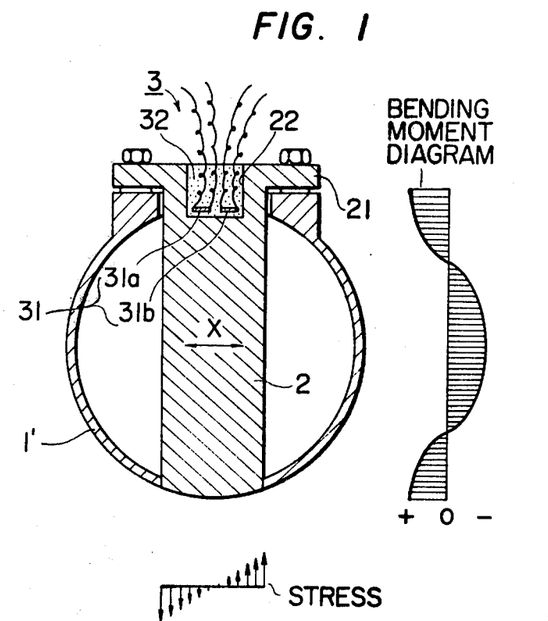
FIG. 1 is a sectional view showing the structure of an embodiment of the present invention; the wave form shown at the right of the figure represents a bending moment diagram depicting the moment generated in the vortex generator by an alternating force due to Karman's vortices applied thereto; the arrow-marks diagram shown at the bottom denotes an internal stress distribution produced in the vortex generator.

In FIG. 1 showing the structure of an exemplary embodiment, 1' is a cylindrical duct in which a fluid to be measured flows, and 2 is a pillar-like vortex generator inserted perpendicularly to the duct 1' and anchored thereto at two ends. The vortex generator is composed of stainless steel in this example. Labeled as 21 is a flange-shaped support portion of the vortex generator; 22 is a cylindrical hole formed at one end of the vortex generator 2 where the support portion 21 is present; 3 is a force detector comprising a sensor 31 and a seal member 32. The sensor 31 is shaped like a disk and is located in the hole 22. In this embodiment, two sensors 31a, 31b are disposed opposite to each other through the center axis of the vortex generator 2, and a piezoelectric element composed of lithium niobate (LiNbO$_3$) is employed for each sensor. The seal member 32 is composed of an insulating material and serves to seal the sensor 31 in the hole 22 while electrically insulating the sensor 31 from the vortex generator 2. In this example, glass is used as the insulating material.

When a fluid to be measured flows in the duct 1' in the above structure, such an alternating force as indicated by an arrow X in FIG. 1 is applied to the vortex generator 2 due to Karman's vortex and generates an alternating stress in the force detector 3, so that the change in the stress is detected in the form of an electric signal by the sensor 31. And the vortex generation frequency can be obtained by detecting the number of times of the said change.

This embodiment is capable of doubling the electric signal by differentially processing the outputs of sensors 31a and 31b.

According to the conventional strain detecting system with a strain gauge used heretofore, the strain on the object surface is required to be great for attaining a high detection sensitivity while the rigidity of the sensor should be small. Also when a piezoelectric element is employed as a strain detecting element, the piezoelectric element receives the stress resulting from the strain generated on the object surface and thereby produces an electric output. In this case as well, it is necessary to generate a great strain on the object surface for obtaining a great output. Thus, there is difficulty in constructing an intrinsically solid sensor according to the strain detecting system.

In this embodiment, the sensor 31 is sealed in the vortex generator 2 by the seal member 32 in an electrically insulated state and is substantially integrated thereiwth, hence achieving efficient detection of the alternating force. And a sufficiently high sensitivity is attainable even with the increased rigidity of the sensor so that the sensor can be formed into a solid construction.

Referring to a concrete example, the alternating force applied to the vortex generator is in proportion to the square of the flow velocity of the fluid to be measured. Accordingly, the strain is also proportional to the square of the flow velocity. One of the features of the flow metering apparatus utilizing Karman's vortex resides in a wide range ability. Supposing now that a flow velocity ranging from 0.3 to 10 m/s is to be measured, the strain will change in a range approximately 1,000 times. In the use of a metallic sensor, its safety limit durable against strain in repeated operation is somewhere around 100 to 200 microstrains. Considering that this value corresponds to the maximum flow velocity 10 m/s, the strain generated at the minimum flow velocity 0.3 m/s becomes approximately 0.1 to 0.2 microstrains, which can hardly be detected. Even by using a semiconductor strain gauge or a piezoelectric element, it is difficult to perform strain detection with a solid construction. Although the measuring range may be divided into small spans each ranging, for example, from 1 to 6 m/s, there still occurs a disadvantage that the range coverable by a single sensor is narrowed.

In the present invention, a sufficiently high sensitivity is attained experimentally at a flow velocity of 0.3 to 10 m/s. The strain presumed and calculated therefrom becomes 0.0048 microstrains at 0.3 m/s or 5.3 microstrains at 10 m/s, which is not detectable at all by the conventional device where a strain detecting element is anchored to a flexible region.

In the strain detecting system, as mentioned above, there exists an essential demerit that a solid construction is not obtainable since the rigidity should be reduced to enhance the sensitivity, and yet the reduction of the rigidity is naturally limited.

As compared with the above, the present invention enables the sensor to have a high rigidity so as to render the construction solid.

In this case, since the entire sensor 31 is fixed firmly in the vortex generator 2 by the seal member 32, the following advantages are achievable.

(1) With excellent force transmission characteristic, the alternating force exerted on the vortex generator can be transmitted accurately to the piezoelectric element with a high sensitivity.

(2) Due to a low air permeability, insulation is not deteriorated by humidity and so forth. As the piezoelectric element is intrinsically a nonconductive substance, its output electric signal is greatly affected even by slight insulation deterioration resulting from humidity and so forth.

(3) Great heat resistance is attainable due to selection of suitable glass having a high melting point above 500° C.

(4) Owing to a sufficiently high dielectric strength, even when the piezoelectric effect is lost with the temperature rising beyond the Curie point of the piezoelectric element during the sealing process, it is possible to restore the piezoelectric effect by carrying out a polarizing or repolarizing process posterior to the sealing.

(5) The sealed state has reproducibility without any variation, hence causing no harmful effect on the characteristic of the piezoelectric element.

(6) The insulating and sealing processes can be executed simultaneously.

(7) Reinforced bonding is attainable between the electrode of the piezoelectric unit and the lead wire.

(8) The production cost is low.

The force transmission efficiency is reduced even by a slight gap formed partially between the seal member 32 and the vortex generator 2 or the sensor 31. Therefore, particularly in the case of using glass, it is desired to dispose the components concentrically around the circular piezoelectric unit so as to prevent cracking of the glass that occurs in non-uniform stressed regions at the time of thermal contraction when the melted glass is cooled and solidified in the sealing process. Moreover, in order to avoid application of any excessive stress to each of the components, the relative dimensions thereof are to be determined with care so that the respective joint surfaces are not separated from each other due to the difference between the individual thermal expansion coefficients. It is rather preferred that each of the joint surfaces is in such a sealed state that a contractive force is exerted mutually.

Figure 2:
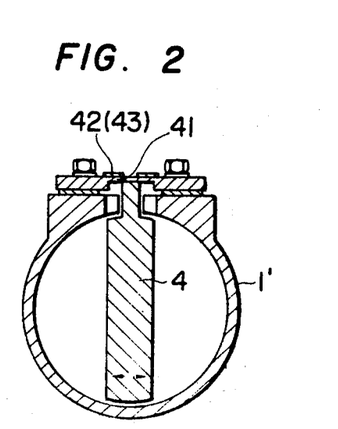
FIG. 2 is a sectional view showing the structure of a flow metering apparatus comprising a conventional elastic part in the vortex generator.

Now an explanation will be given on the experiments conducted with regard to the influence of noise resulting from vibration of the duct, for comparison between the apparatus of this invention shown in FIG. 1 and the strain detecting system in which, as shown in FIG. 2, a flexible region 41 is formed in a vortex generator 4 so as to reduce the rigidity of a sensor, and a pair of strain detecting elements 42 are provided in the flexible region 41 symmetrically with respect to the center axis of the vortex generator 4 in the direction of alternating force, and a vortex signal is produced in response to the vibration of the vortex generator 4.

In FIGS. 1 and 2, one element located on the right is labeled as first detecting element, while the other located on the left is labeled as second detecting element.

The duct vibration raises a problem when its frequency fp is included in the band of vortex signal frequencies fv and the duct vibration output is superposed on the vortex signal output. In such a case, if the noise frequency component fp of the duct vibration is cut off electrically, the vortex signal component fv is also cut off to bring about failure in electrical elimination of the noise component, thereby rendering measurement impossible. (Electrical cutoff is easily performed for any noise of which frequency is higher than the band of vortex signal frequencies.)

Figure 3:
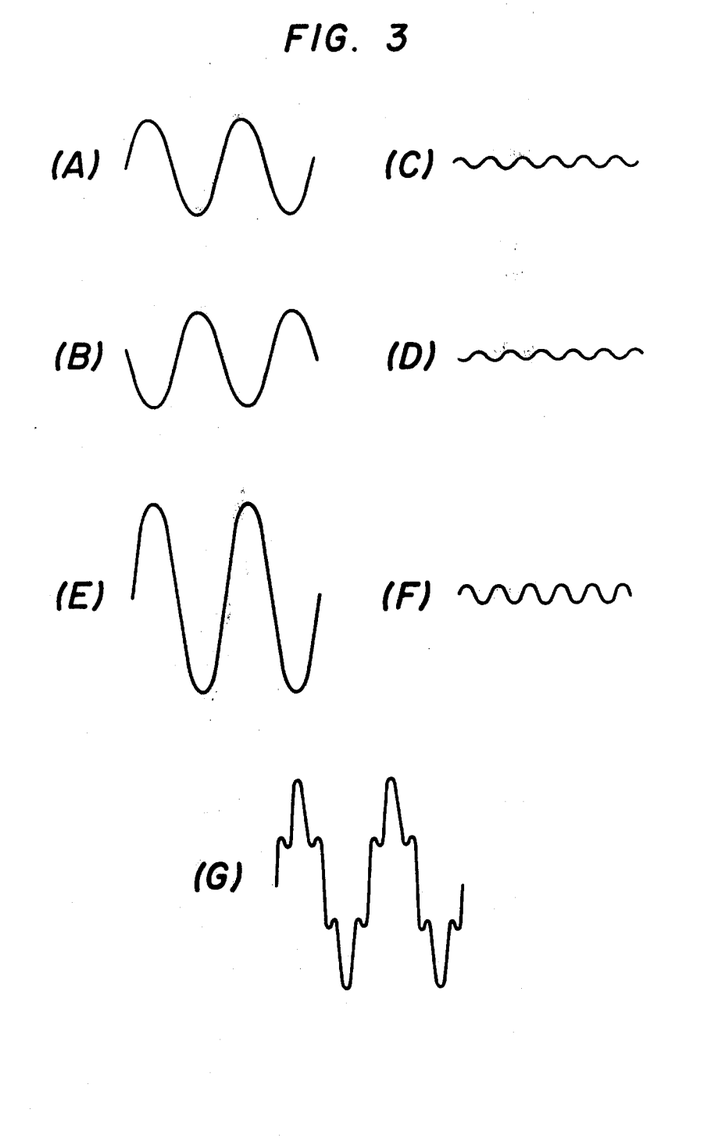
FIGS. 3A-G are a wave form graph depicting the operation of the apparatus of FIG. 2.

Here the frequency fp of the duct vibration noise is supposed to be included in the band of vortex signal frequencies fv. Generally the vortex generator is so designed that its natural vibration frequency fn takes a value higher than the band of the vortex signal frequencies fv. In the strain detecting system, however, the natural frequency fn is low due to small rigidity of the sensor as mentioned before and takes a value proximate to the duct vibration noise frequency fp, at which the vortex generator is liable to be vibrated. And in the same manner as the vortex signal shown in FIGS. 3 (A) and (B), this vibration appears as opposite-phase outputs of the first and second detecting elements as shown in FIGS. 3 (C) and (D), so that the respective differential outputs of the vortex signal and the duct vibration noise become such as shown in FIGS. (E) and (F). Accordingly, the combined output signal has a poor signal-to-noise ratio as illustrated in FIG. 3 (G). This influence becomes conspicuous in the measurement of a low flow rate at which the level of the duct vibration noise is high relatively to the vortex signal, hence causing difficulty in the measurement.

Figure 4:
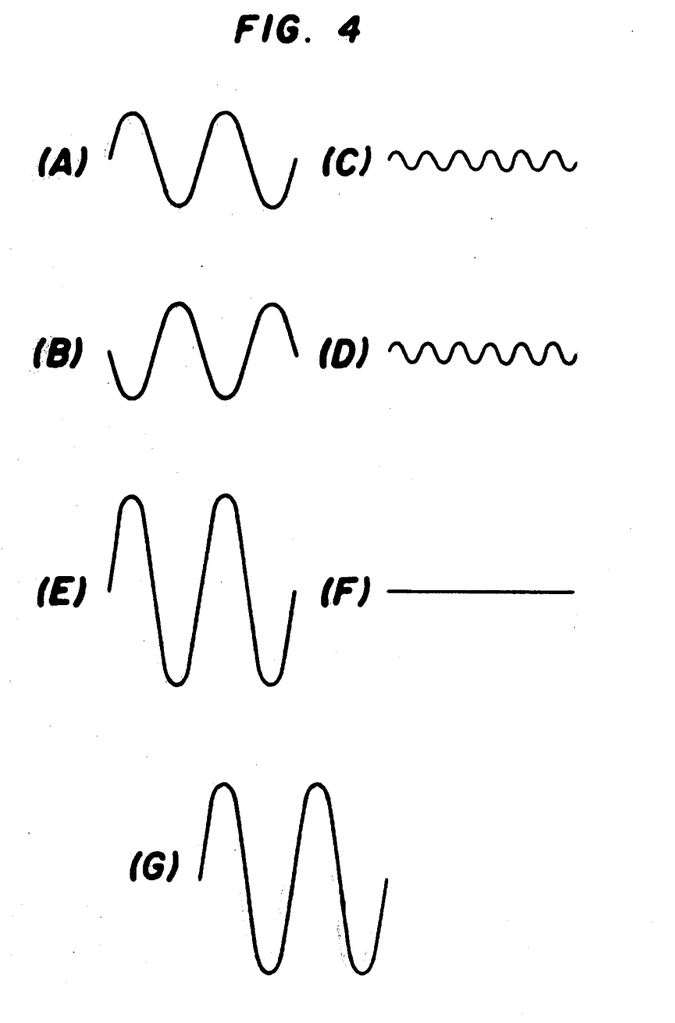
FIGS. 4A-G are a wave form graph depicting the operation of the apparatus of FIG. 1.

In the apparatus of the present invention, the natural vibration frequency fn is high due to great rigidity with a substantially integrated construction of the sensor and the vortex generator, and the entire sensor vibrates together with the duct. This vibration appears as an acceleration in the sensor and, contrary to the opposite-phase vortex signal outputs in FIGS. 4 (A) and (B), the noise outputs of the first and second detecting elements have an in-phase relation to each other as shown in FIGS. 4 (C) and (D), so that the respective differential outputs of the vortex signal and the duct vibration noise become such as shown in FIGS. 4 (E)and (F). Consequently, the combined output contains the vortex signal alone and has, even at a low flow rate, a satisfactory signal-to-noise ratio as shown in FIG. 4 (G), hence rendering possible the measurement of a low flow rate.

As described above, differing from the strain detecting system, the present invention is capable of performing wide-range measurement of flow rates nearly without receiving any influence of the duct vibration noise.

Figure 5:
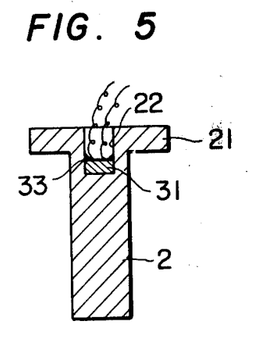
FIGS. 5 through 7 each show a sectional view of parts of other embodiments of the invention.

FIG. 5 illustrates the structure of principal parts of another embodiment according to the present invention, in which a sensor 31 is anchored 33 to a hole 22 formed in a vortex generator 2. Although a bonding agent is used for anchoring the sensor 31 in this example, welding or press fitting is also applicable in addition to bonding.

Figure 6:
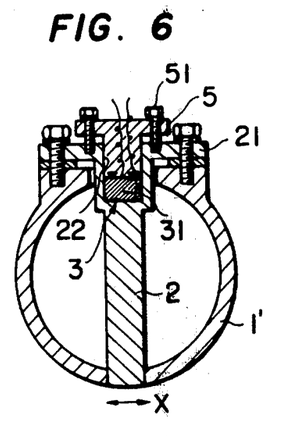

FIG. 6 illustrates the structure of another embodiment according to the present invention, in which a disk-like sensor 31 is inserted removably into a hole 22 formed in a vortex generator 2. Labeled as 5 is a pillar-shaped stationary member having a flange so that a bolt 51 is tightened to push and fix the sensor 31, which is inserted into the hole 22, in the vortex generator. This structure permits removal of the sensor 31 from the vortex generator 2 for maintenance or the like while leaving intact the vortex generator 2 attached to the duct 1, thereby facilitating maintenance and inspection of the sensor 31 without stopping the flow of the fluid to be measured.

Figure 7:
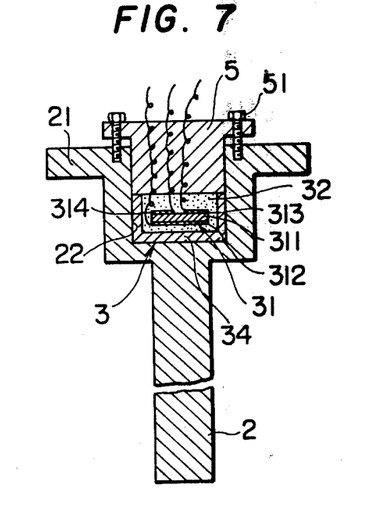
Figure 8:
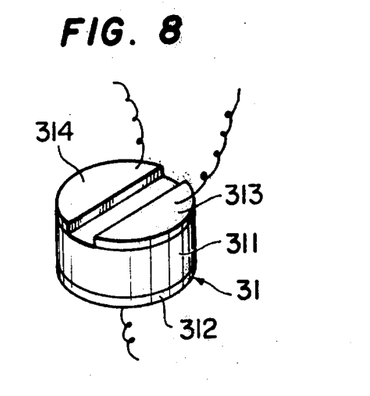
FIG. 8 is a perspective view of force sensor means employed for the apparatus shown in FIG. 7.

FIG. 7 illustrates the structure of another embodiment according to the present invention, and FIG. 8 shows principal parts of FIG. 7. Labeled as 3 is a force detector comprising a sensor 31, a seal member 32 and a cylindrical vessel 34 with a bottom. The force detector 3 is inserted removably into a hole 22. Owing to such a constitution, the force detector 3 is producible separately from the vortex generator 2 to facilitate manufacture. The seal member 32 serves to seal the sensor 31 in the vessel 34. The sensor 31 is shaped like a disk as shown in FIG. 8, and its center is positioned exactly on the center axis of the vortex generator 2. The sensor 31 comprises a disk-like detecting element 311, which is composed of lithium niobate, and electrodes 312, 313 and 314. The electrode 312 is shaped into a thin disk and is located on one side of the detecting element 311, while the electrodes 313 and 314 are shaped to be substantially arcuate and are disposed on the other side of the element 311 symmetrically with respect to the center of the element 311. In this structure, a vortex signal detected between the electrodes 312 and 313 is opposite in phase to a vortex signal detected between the electrodes 312 and 314 as plotted in FIGS. 4 (A) and (B), and the output produced therefrom differentially becomes double as plotted in FIG. 4 (E) in comparison with (A) and (B). And the noise such as duct vibration included in the vortex signal frequency band is detected to produce in-phase outputs of FIGS. 4 (C) and (D), which are then processed differentially to cancel the noise components each other, thereby obtaining a vortex signal of a satisfactory signal-to-noise ratio. Due to the merit that merely a single detecting element is required, a cost reduction is achievable with a smaller space needed to provide a compact construction.

Figure 9:
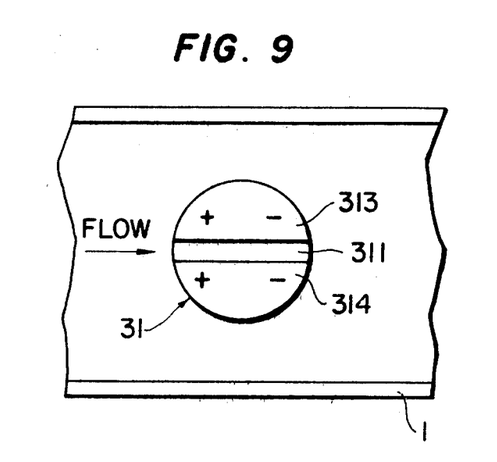
FIG. 9 illustrates the polarity of an electric charge generated in force sensor means due to the noises of fluid vibration.

Moreover, if the electrodes 313 and 314 are so disposed as to be symmetrical with respect to the center of the detecting element 311 in the direction of alternating force, the electric charges generated in the sensor 31 by the noise resulting from fluid vibration such as fluid pulsation in the flowing direction become positive or negative at a certain moment as sketched in FIG. 9, but such charges cancel each other internally and therefore do not appear as an output. Consequently, the fluid vibration noise is eliminated to obtain a vortex signal of a satisfactory singal-to-noise ratio.

Figure 10A:
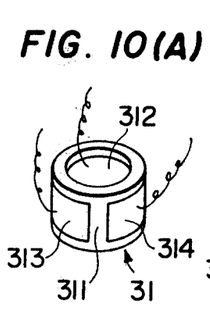
FIGS. 10A, 10B and 10C are perspective views of other force sensor means useful in the invention.
Figure 10B:
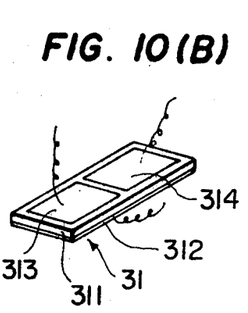
Figure 10C:
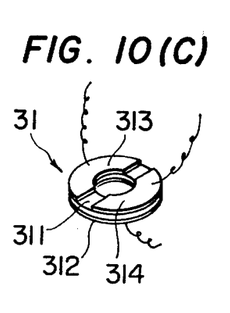

The sensor 31 of FIG. 8 may be cylindrical as in FIG. 10 (A) or rectangular as in FIG. 10 (B), or may be shaped like a doughnut disk as in FIG. 10 (C).

Furthermore, if the electrode 312 is divided into two arcuate electrodes correspondingly to the electrodes 313 and 314, the output of the sensor 31 can be doubled by connecting the arcuate electrodes in series when produced in the form of voltage or in parallel when produced in the form of electric charge.

Connection of the electrodes may be effected on the surface of the sensor 31, but a further convenience is offered by drawing out four lead wires from each electrode so that series or parallel connection is rendered selectable as required.

Although in the foregoing embodiment the two ends of the vortex generator 2 are fixed to the duct 1', it may be a combination of fixed end—free end or of fixed end—supported end.

For fixing the vortex generator 2, any other means is selectable such as welding, screwing or bolting.

The force detector 3 in the foregoing embodiment is inserted in the hole 22 formed on the support region 21 of vortex generator 2, but it may be located on the other side of the vortex generator or at any position suited for detection of the stress.

The sensor 31 employed in the foregoing embodiment comprises a piezoelectric element composed of lithium niobate. However, it may be replaced with a piezoelectric crystal of lithium niobate or quartz, or a ceramic piezoelectric or pressure-sensing element of zircon titanate (PZT) or titanate. In short, any element capable of sensing a force is usable. In case the working temperature of a seal member for sealing and anchoring a ceramic piezoelectric element is higher than the Curie point of the element, it is necessary to execute a repolarizing process posterior to termination of the sealing process. Since the seal member has a sufficiently high dielectric strength, repolarization can be performed with ease.

The seal member 32 is not limited to glass alone, but may be other sealing material such as epoxy, ceramic or cement. It is possible to use any material if it is an electric insulator with chemical stability and is capable of accurately transmitting the force, which is applied to the vortex generator 2, to the detecting element with high sensitivity.

In the present invention, every component brought into contact with the fluid may be selectively composed of an anticorrosive material. And also in the case of coating such a component with an anticorrosive material, there exists no possibility of causing a sensitivity reduction that occurs in the use of a diaphragm or a heat-sensing element in the conventional apparatus, hence providing excellent corrosion-resisting characteristic to permit measurement in any of highly corrosive fluids.

Figure 11:
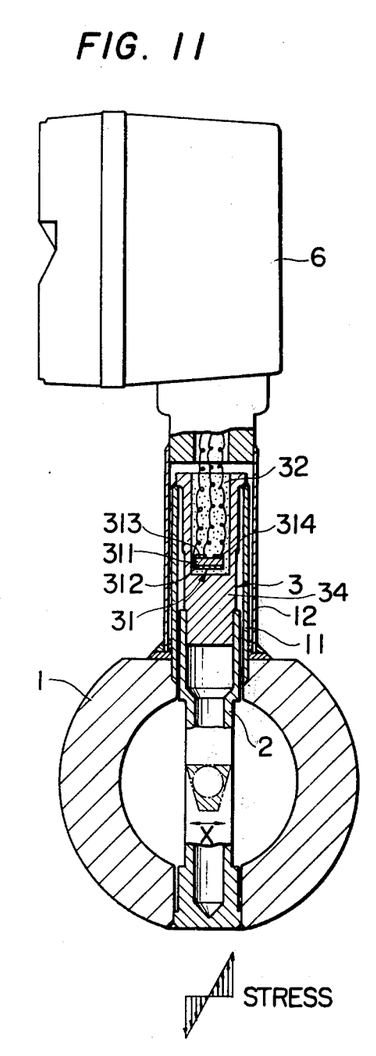
FIG. 11 is a sectional view showing another apparatus embodying the invention.

FIG. 11 illustrates the structure of another embodiment according to the present invention, in which 1 is a cylindrical duct, and 2 is a pillar-shaped vortex generator of stainless steel inserted into the duct 1 perpendicularly thereto and fixed at its one end to the duct 1. Labeled as 3 is a force detector comprising a sensor 31, a seal member 32 and a cylindrical vessel 34 with a bottom. One end of the force detector is fixed to the other end of the vortex generator 2, while its other end is fixed to one end of an inner cylinder 11 whose other end is fixed to the duct 1. The sensor 31 is sealed in the vessel 34 by the seal member 32 which is composed of, in this example, a glass material so as to insulate the sensor electrically from the vessel. The sensor 31 is shaped like a disk and its center axis is positioned exactly on the center axis of the vortex generator 2. In this embodiment, as shown in FIG. 8, the sensor 31 comprises a disk-like detecting element 311 of lithium niobate, and electrodes 312, 313 and 314. Labeled as 6 is a converter attached to one end of an outer cylinder 12 whose other end is fixed to the duct 1.

When a fluid to be measured flows in the duct 1 in the above structure, such an alternating force as indicated by an arrow X in FIG. 11 is applied to the vortex generator 2 due to Karman's vortex. This alternating force is transmitted to the force detector 3 so that the vortex generation frequency can be detected.

In the meanwhile, the entire duct is vibrated by the vibratory noise propagating through the duct from a pump, a compressor or switching of a damper. When such vibration is particularly great, the vortex generator 2 and the force detector 3 (hereinafter referred to as force receiving assembly) receives a force in the direction where the said alternating force X is exerted, so that this force causes an alternating bending moment $M\alpha$ based on the mass distribution of the force receiving assembly. And the alternating bending moment $M\alpha$ is detected as noise in the sensor 31.

Figure 12:
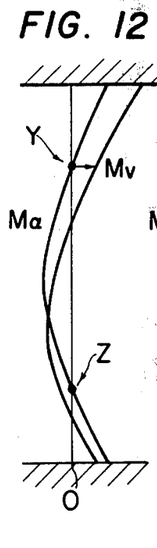
FIGS. 12 and 13 show diagrams of bending moment applied to the vortex generator due to duct vibrations.

FIG. 12 is a bending moment diagram showing such a moment $M\alpha$, in which MV represents the alternating bending moment caused by generation of vortex. In this embodiment, the sensor 31 is located at a position Y where the bending moment $M\alpha$ becomes zero, and it is spaced apart by 0.2 l to 0.3 l on the basis of the distance l between the stationary ends of the force receiving assembly. Consequently, the stress resulting from the bending moment $M\alpha$ is not detected by the sensor 31 located at the position Y, and thus the noise resulting from vibration of the duct is not detected.

Therefore, this embodiment offers excellent vibration resistance without detecting the noise that is based on the duct vibration. And great effect is ensured particularly in the measurement of such a fluid as air having a small vortex force in general.

Figure 13:
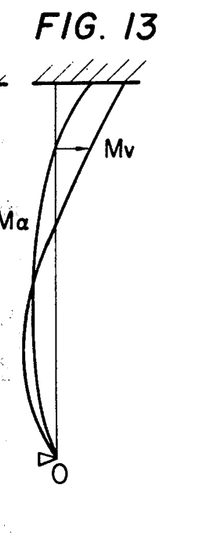

In the double-support construction of this embodiment, there exist two points where the bending moment $M\alpha$ becomes zero. It is obvious, therefore, that the structure can be so modified as to dispose the sensor 31 at a point Z in FIG. 12. In case the force receiving assembly is supported at one end while being fixed at the other end, there exists one point where the bending moment $M\alpha$ becomes zero as shown in FIG. 13. And such a point is freely shiftable by changing the mass distribution of the force receiving assembly, so that the sensor can be set at a position where the bending moment MV resulting from vortex generation is maximum.

In this embodiment, the pressure receiving assembly and the converter 6 are anchored to the duct 1 individually by the inner cylinder 11 and the outer cylinder 12 so that the pressure receiving assembly is rendered free from influence of the vibration caused by the converter 6 of a relatively great mass.

Figures 14A, 14B, 15, 16:
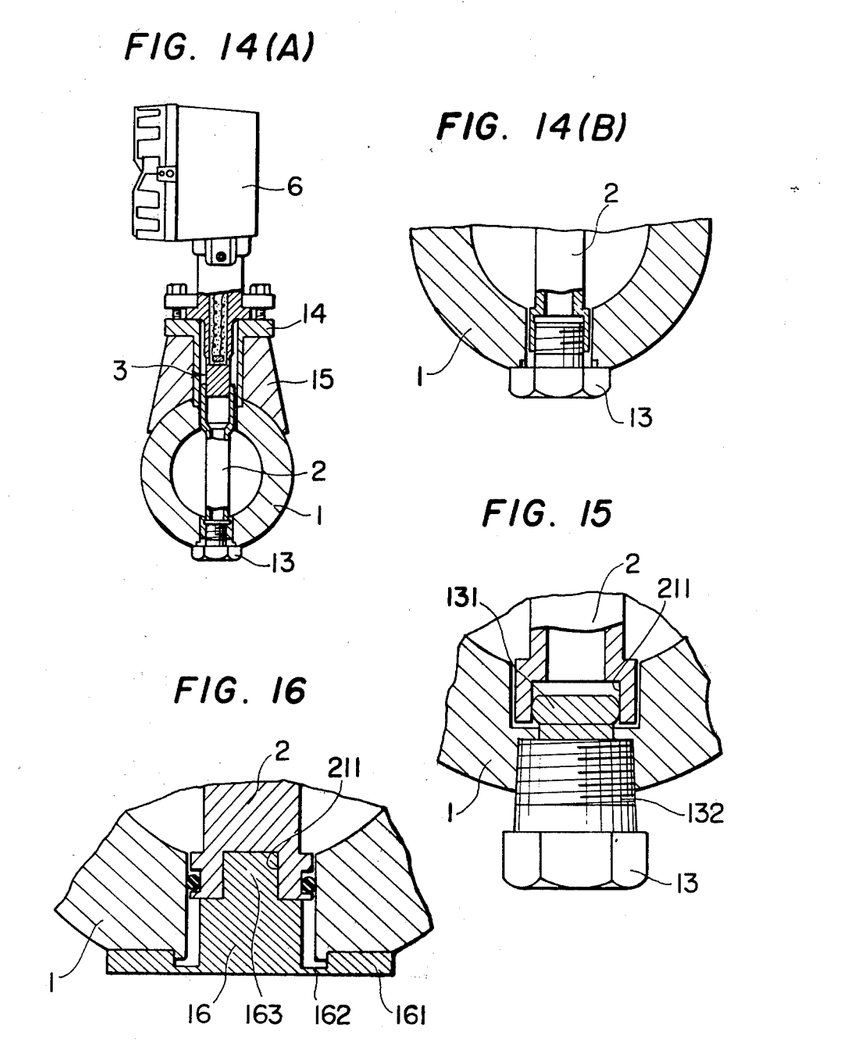
FIG. 14A is a cross-sectional view showing the structure of another embodiment of the invention.
FIGS. 14B, 15 and 16 are sectional views showing examples of securing an end of the vortex generator to a duct.

FIG. 14 illustrates the structure of another embodiment according to the present invention, in which (A) is a general view and (B) shows the structure of its principal parts. In this embodiment, one end of a force receiving assembly is fixed to a duct 1 by means of bolts 13, while the other end thereof is fixed to the duct 1 through a support member 14 which is anchored to the duct 1 firmly by a reinforcing plate 15, thereby further strengthening the construction.

FIG. 15 illustrates the structure of principal parts of another embodiment according to the present invention, in which a recess 211 is formed at one end of a vortex generator 2, and a spherical portion 131 formed at the tip of a bolt 13 is inserted into the recess 211 to support one end of the vortex generator 2, and a screw portion 132 of the bolt 13 is equipped with taper threads. This screw portion may be fitted to the duct 1 tightly or loosely as required, and the joint to the duct 1 may be welded so as to accomplish an improved construction with further stabler sealing.

The embodiment of FIG. 15 is capable of facilitating attachment or detachment of the force receiving assembly and also absorbing its axial expansion that occurs in measurement of a high-temperature fluid.

FIG. 16 illustrates the structure of principal parts of another embodiment according to the present invention, in which a pillar-shaped blind cover 16 having a flange 161 with a flexible portion 162 is attached fixedly to a duct 1, and a protrusion 163 is inserted into a recess 211 of a vortex generator 2 to support one end thereof. In this case, the same effect as in FIG. 15 is expectable.

In the foregoing embodiments of FIGS. 11 through 16, the force detector is disposed at a position where the stress caused in the force receiving assembly by a disturbance force becomes zero, hence realizing a solid apparatus which offers excellent vibration resistance without picking up the noise based on the disturbance force.

Figure 17:
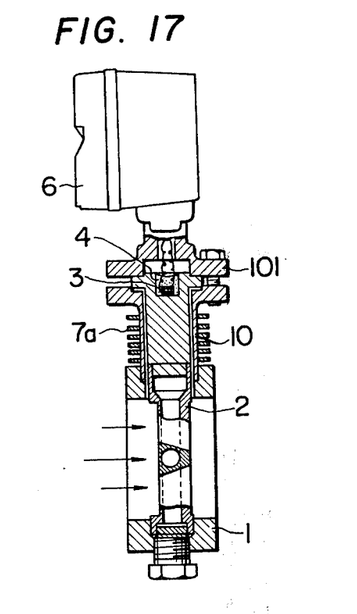
FIGS. 17 through 20 are schematic diagrams of other embodiments of the present invention adapted for measuring a fluid at high temperatures.

FIG. 17 illustrates the structure of another embodiment according to the present invention, in which disk-like radiation fins 7a are provided on the outer surface of a support member 10. In this example, the fins are composed of aluminum.

In measurement of a high-temperature fluid, the maximum withstand temperature of the force detector 3 itself is approximately 300° C.

When measuring a fluid in a higher temperature range between 300° C. and 500° C., the heat transmitted to the duct 1 is further transmitted to the support member 10 but is radiated therefrom due to the fins 7a, and thus a temperature rise in the force detector 3 is prevented effectively to maintain the force detector 3 lower than the maximum withstand temperature thereof. In this case, since there is a wide difference between the atmosphere temperature and a high-temperature state ranging from 300° C. to 500° C., great effect is attained from radiation by the fins 7a.

Figure 18:
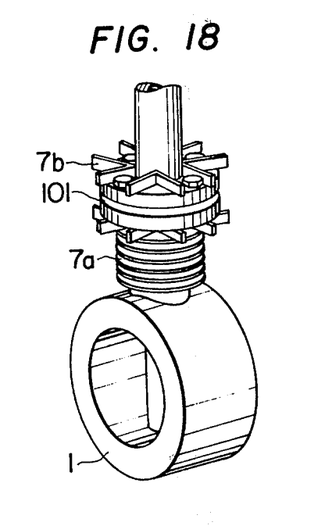

FIG. 18 illustrates the structure of another embodiment according to the present invention, in which radiation fins 7b are provided radially on a flange 101 of a support member 10 to ensure greater radiation effect. Moreover, owing to additional radiation performed in the support member 10 interposed between a force detector 3 and a converter 6, it becomes possible to lower the temperature of the converter 6 as well.

Figure 19:
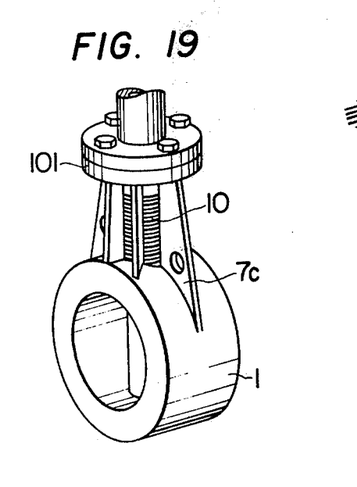

FIG. 19 illustrates the structure of another embodiment according to the present invention. In this example, radiation fins 7c are provided along the axial direction of a support member 10 and serve also to reinforce the support member 10 simultaneously with performing radiation, thereby further increasing the solidity of the apparatus.

Figure 20:
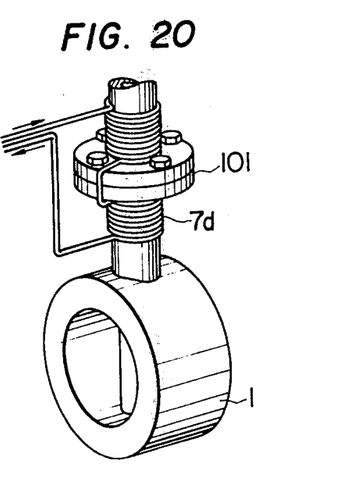

FIG. 20 illustrates the structure of another embodiment according to the present invention, in which a cooling pipe 7d is wound around the outer surface of a support member 10, and a cooling fluid such as water is supplied to flow through the pipe 7d so as to prevent temperature rise in a force detector 3 and a converter 6. In this embodiment, it is possible to change the flow velocity of the cooling fluid in accordance with the temperature of a fluid to be measured, so that the cooling capability is changeable as desired to achieve efficient cooling effectively without depending on natural radiation.

The material and shape of the radiator are not limited to the foregoing examples alone, and any other material or shape is selectable.

In the embodiments of FIGS. 17 through 20 described above, a radiator is equipped outside of the duct so as to prevent temperature rise in the force detector 3 whose withstand temperature is the lowest among the components of the apparatus. This accomplishes, as a result, a wide-range flow metering apparatus which is capable of measuring even a high-temperature fluid as well.

Figure 21:
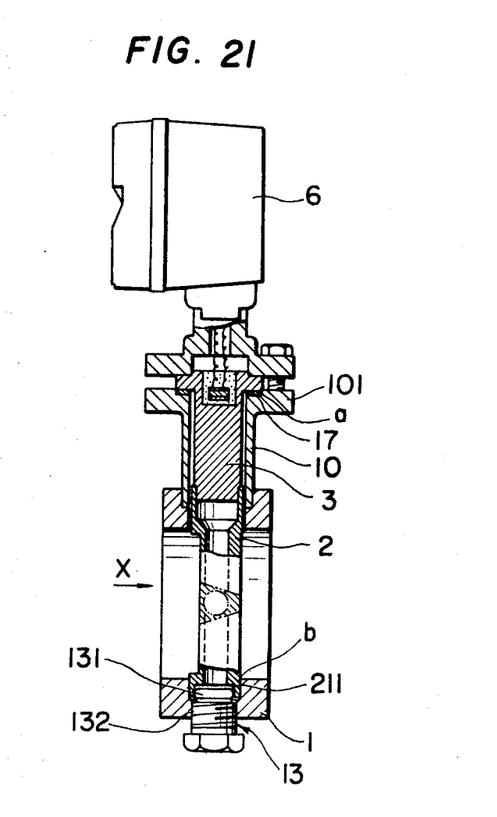
FIGS. 21 and 22 are sectional views showing other embodiments of the invention.

FIG. 21 illustrates the structure of another embodiment according to the present invention. Labeled as 1 is a cylindrical duct in which a fluid to be measured flows; 13 is a bolt provided in the duct 1 and having a spherical portion 131 at its tip and also a screw portion 132 equipped with taper threads; and 2 is a pillar-shaped vortex generator composed of stainless steel and inserted into the duct 1 perpendicularly thereto. The vortex generator 2 is supported fixedly in the duct 1 in the state where a recess 211 formed at one end thereof is fitted to the spherical portion 131. A force detector 3 is connected at one end to the vortex generator 2 while being fixed at the other end to a cylindrical support member 10 through a packing 17. The inner cylindrical area of the duct 1, the outer surfaces of both the vortex generator 2 and the force detector 3, and the inner tubular area of the support member 10, all of which are to be in contact with a fluid for measurement, are coated with an anticorrosive material such as Teflon.

In this embodiment, an alternating force applied to the vortex generator 2 due to Karman's vortex is detected directly by the force detector 3. Therefore, even if the components to be in contact with the fluid are coated with an anti-corrosive material, there exists no possibility of causing a sensitivity reduction that occurs in the use of a diaphragm or a heat-sensing element in the conventional apparatus, hence providing excellent corrosion-resisting characteristic to permit measurement in any of highly corrosive fluids.

In the conventional apparatus used generally heretofore, the maximum measurable temperature is somewhere around 120° C. In the present invention, however, the withstand temperature of the force detector 3 is as high as 300° C. and therefore permits measurement of a fluid at a maximum temperature of 300° C. Since the reaction of a corrosive substance increases with temperature rise, this embodiment is particularly effective for measurement of any high-temperature fluid having highly corrosive property.

The joint a between the vortex generator 2 and the duct 1, and also the joint b between the forst detector 3 and the support member 10, may both be coated to serve as seals. Then, the necessity of special seal means such as packing 17 or taper screw portion 132 is eliminated to simplify the structure, thereby facilitating attachment or detachment of the vortex generator 2 to the duct 1.

Although in the foregoing embodiment the components to be in contact with the fluid are coated with Teflon, the coating material is not limited to Teflon alone but may be any suitable anticorrosive substance such as alumina, ceramic or ultrahard alloy. Moreover, the art of lining or (plasma) flame coating is also applicable. In short, the requisite is merely that the component regions brought into contact with the fluid are converted with an anticorrosive material.

Thus, the embodiment of FIG. 21 accomplishes a highly anticorrosive flow metering apparatus of a simplified construction.

Figure 22:
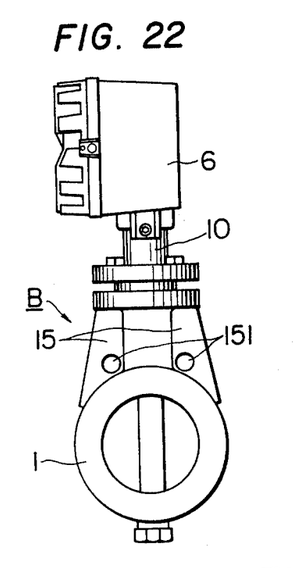
Figure 23:
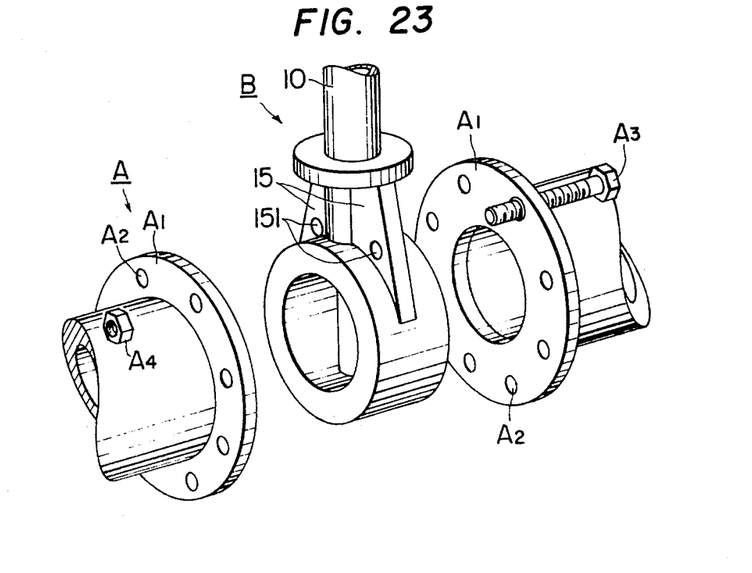
FIG. 23 is a diagrammic illustration of a case where the apparatus of FIG. 22 is installed in a duct.

FIG. 22 illustrates the structure of another embodiment according to the present invention, and FIG. 23 shows how the embodiment of FIG. 22 is installed in a duct line.

In FIGS. 22 and 23: A is a duct line in which a fluid to be measured flows; A1 denotes disk-like flanges disposed opposite to each other in the duct line A; A2 denotes bolt mounting holes formed in the flowing direction at equal intervals along the circumference of each flange A1; B is a flow metering apparatus; and 1 is a cylindrical duct whose planes at the two ends thereof are held between the flanges A1, and the fluid to be measured flows therein. Labeled as 10 is a cylindrical support member connected at one end to the duct 1; 6 is a converter fixed to the other end of the support member 10; 15 is a reinforcing plate provided on the duct 1 with its face turned to the flowing direction; 151 denotes two through holes formed at positions corresponding to the bolt mounting holes A2 for insertion of bolts A3; and A4 is a nut for the bolt A3. The opposed flanges A1 are coupled to each other by means of bolts A3 and nuts A4 in the manner to hold the duct 1 therebetween. When installing the flow metering apparatus B in the duct line A, it is necessary to align the center axes of both the duct 1 and the duct line A with each other in assembling so as to avoid an error in measurement. For this purpose, the known assembling method requires some special components such as an adjusting ring which is in contact internally with the duct 1 while being in contact externally with the bolts A3, or a plurality of blocks kept in contact externally with the duct 1 in the state where the bolts A3 pierce through the blocks. And thus, assembling becomes troublesome due to the necessity of using such components.

In this embodiment, the duct 1 is held between the two flanges A1 as shown in FIG. 23, and two bolts A3 are inserted into the mounting holes A2 of one flange A1, the through holes 151 and further into the mounting holes A2 of the other flange A1. Then the two bolts are tightened with nuts A4. And subsequently, other bolts A3 are inserted into the opposed mounting holes A2 of the two flanges A1, and are tightened with nuts A4. As a result, no special component is required for aligning the center axes of the duct line A and the duct 1 with each other in assembling, so that the duct 1 can be attached easily to the duct line A with an additional merit that the support member 10 is strengthened by the reinforcing plate 15 to eliminate undesirable vibration of the support member 10 which may otherwise be caused by the vibration of the converter 6 of a relatively great mass due to external vibration.

Figure 24:
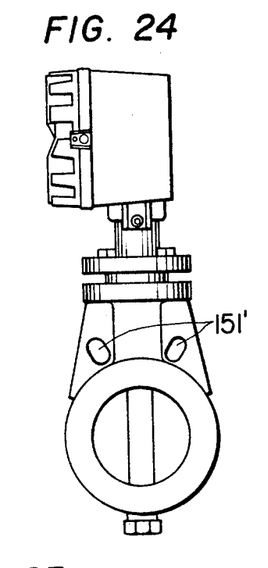
FIG. 24 is a sectional view illustrating another example of holes as shown in FIG. 22.

The through hole 151 need not always be round. As shown in FIG. 24, it may be an elliptic hole 151' whose apse line is in the radial direction of the flange. Since the positions of flange mounting holes A2 are different depending on the diameter of the duct 1 and specifications, the elliptic hole 151' is convenient for adjustment of such positional difference.

Thus, in the embodiments of FIGS. 22 through 24, alignment of the center axes of both the duct line and the duct can be attained with ease in assembling, thereby accomplishing a solid flow metering apparatus.

Figure 25A:
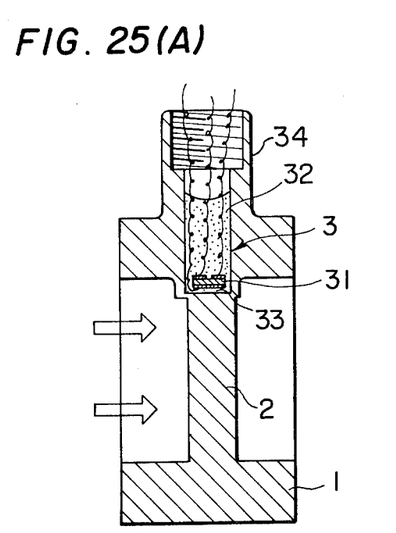
FIG. 25A shows a front view of another embodiment of the invention.
Figure 25B:
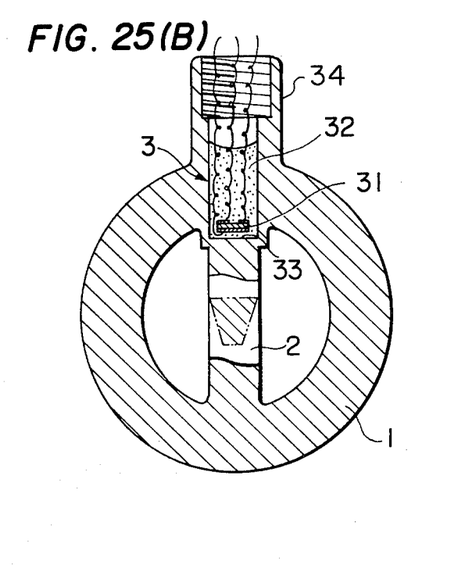
FIG. 25B is a side view of that embodiment.

FIG. 25 illustrates the structure of another embodiment according to the present invention, in which (A) is a front view, and (B) is a sectional side view. Labeled as 1 is a cylindrical duct, and 2 is a vortex generator shaped like a trapezoidal pillar and inserted into the duct perpendicularly thereto. A force detector 3 comprises a sensor 31, a seal member 32 and a cylindrical vessel 34 with a bottom, and is connected at one end to the vortex generator 2 while being fixed at the other end to the duct 1. And the duct 1, the vortex generator 2 and the vessel 34 are integrated with one another.

Such a structure ensures a simplified and stout construction to provide a compact, lightweight apparatus with a reduction of production cost. Particularly, the force detector 3 can be constituted by integrating the duct 1, the vortex generator 2 and the vessel 34 as in this embodiment by the art of, for example, precision casting and subsequently sealing the sensor 31 with the seal member 32. Therefore, in comparison with the method of producing the duct 1, the vortex generator 2 and the force detector 3 individually, it is possible to obtain a lower-cost and stout construction. Moreover, since there is no gap among the components which are brought into contact with the fluid for measurement, high anticorrosion characteristic is attained against any corrosive fluid to be measured.

It is also to be noted that if the duct 1, the vortex generator 2 and the seal member 32 are composed of a high molecular material such as hard plastics, an integrated mold is obtainable with the sensor 31 sealed therein, hence further facilitating the manufacture. By the use of a high molecular material such as plastics, the surfaces of the components to be in contact with the fluid are rendered smoother than metallic surfaces, so that the apparatus becomes suitable for flow measurement of foodstuff and so forth. And still the high molecular material is generally excellent in anticorrosion characteristic, and particularly the use of ethylene tetrafluoride resin or the like offers high anticorrosion characteristic that can never be achieved by using any metallic material.

In the present invention, as described hereinabove, an alternating force applied to a vortex generator due to Karman's vortex is detected by a force detector which is attached firmly to the vortex generator substantially in an integrated manner, then the vortex frequency is measured in accordance with the number of times of the alternation, and the flow velocity or quantity of the fluid is obtained therefrom.

Since the force detector is thus integrated with the vortex generator and there exists no moving part, the construction is remarkably simplified to provide a solid apparatus of which high sensitivity is not deteriorated by adhesion of dust to the vortex generator and so forth. Moreover, a suitable anticorrosive material is selectable as desired for the components brought into contact with the fluid to be measured, and yet there is no restriction with respect to coating of such a material, so that the apparatus is usable even for measurement of a highly corrosive fluid as well.

Particularly for the member that seals the force detecting element in the vortex generator, the use of a high withstand-temperature substance such as glass will offer a greater heat resistance. Consequently, even in a high-temperature fluid of highly corrosive property, it becomes possible to perform measurement that has been difficult for the conventional apparatus.

Furthermore, the apparatus of this invention is capable of easily eliminating the noise component and so forth resulting from vibration of the duct.

We claim:

1. A flow metering apparatus comprising:
a duct in which a fluid to be measured flows;
a pillar-shaped vortex generator in said duct;
a pair of force sensor means in said vortex generator and positioned to receive differential stresses produced therein due to the vortices generated thereby; and
securing means comprising a pillar-shaped member pressed against said pair of force sensor means in the vortex generator and inelastic material engaging said sensor means for firmly securing and sealing said force sensor means inside the vortex generator to provide that said force sensor means is effectively integral with said vortex generator, whereby the pair of force sensor means are capable of directly detecting an alternating force applied to the vortex generator due to the development of Karman's vortices generated thereby and converting said alternating force into an electric output signal.

2. The flow metering apparatus as defined in claim 1 wherein said pair of force sensor means are piezoelectric elements.

3. The flow metering apparatus as defined in claim 1, wherein said securing means comprises a glass compound.

4. A flow metering apparatus comprising:
a duct in which a fluid to be measured flows;
a pillar-shaped vortex generator in said duct having a cavity formed at one end thereof;
a pair of force sensor means disposed in said cavity and positioned to receive differential stresses produced therein due to the vortices generated thereby; and
securing means comprising inelastic material engaging said sensor means for firmly securing and sealing said force sensor means inside the vortex generator to provide that said force sensor means is effectively integral with said vortex generator, whereby the pair of force sensor means are capable of directly detecting an alternating force applied to the vortex generator due to the development of Karman's vortices generated thereby and converting said alternating force into an electric output signal.

5. The flow metering apparatus as defined in claim 4, wherein said securing means comprises a glass compound.

6. The flow metering apparatus as defined in claim 4, wherein said pair of force sensor means are piezoelectric elements.

7. The flow metering apparatus as defined in claim 4 wherein said vortex generator comprises an extended portion positioned outside of the duct; said force sensor means being located in said extended portion.

8. The flow metering apparatus as defined in claim 7 comprising radiation fins between said force sensor means and said duct.

9. The flow metering apparatus as defined in claim 7, comprising a cooling pipe between said force sensor means and said duct.

10. The flow metering apparatus as defined in claim 4 comprising a container vessel formed with said cavity and secured to one end of the vortex generator;
said pair of force sensor means being disposed in said vessel; and
said securing means serving to hold said pair of force sensor means firmly in said vessel.

11. A flow metering apparatus comprising:
a duct in which a fluid to be measured flows;
a pillar-shaped vortex generator in said duct;
a piezoelectric element disposed in said vortex generator to be so positioned that the center axis of the piezoelectric element is in alignment with the neutral axis of a stress developed in the vortex generator by the shedding of vortices therefrom;
said piezoelectric element being equipped with at least two sets of electrodes disposed symmetrically with respect to said center axis and coupled to each other differentially;
means for securing and sealing said piezoelectric element in the vortex generator firmly to become substantially integral therewith, said piezoelectric element being capable of directly detecting an alternating force applied to the vortex generator by said vortices and serving to convert the alternating force into an electric output signal.

12. A flow metering apparatus comprising:
a duct in which a fluid to be measured flows;
a pillar-shaped vortex generator in said duct;
force sensor means fixed firmly to said vortex generator to be substantially integral therewith; and
means comprising inelastic material engaging said force sensor means for firmly gripping and sealing said force sensor means in the vortex generator;
said vortex generator being secured at one end and supported at the other end in such a manner that the stress generated therein as the result of a disturbance force in the duct differs from the stress resulting from an alternating force caused by vortex shedding, and said force sensor means is positioned in the vortex generator where the stress generated as the result of such disturbance force is substantially zero;
whereby said force sensor means is capable of directly detecting an alternating force applied to the vortex generator due to vortex shedding generated thereby to convert the alternating force into an electric output signal.

* * * * *